United States Patent [19]

Hoffmann

[11] Patent Number: 4,798,149

[45] Date of Patent: Jan. 17, 1989

[54] WHEEL LOCK ASSEMBLY

[75] Inventor: Frank F. Hoffmann, St. Clair, Mich.

[73] Assignee: Florkey's Conveyor Service, Inc., Warren, Mich.

[21] Appl. No.: 446,195

[22] Filed: Dec. 2, 1982

[51] Int. Cl.$^4$ ............................................. F16C 33/60
[52] U.S. Cl. ..................... 105/155; 384/58; 384/447; 384/449; 384/543; 16/98; 16/102; 403/350; 104/94
[58] Field of Search ............. 16/107, 98, 97, 102, 16/DIG. 34; 403/350, 380, 354, DIG. 8; 308/27, 18; 410/130-139; 104/94, 95; 105/154, 155, 148; 198/845, 838; 384/58, 447, 449, 543

[56] References Cited

U.S. PATENT DOCUMENTS

| | | | |
|---|---|---|---|
| 1,445,893 | 2/1923 | Krump | 105/154 |
| 3,412,809 | 11/1968 | Shiret | 403/350 |
| 3,467,450 | 9/1969 | Schmidt et al. | 384/447 |
| 3,553,765 | 1/1971 | Frost | 16/107 |
| 3,602,150 | 8/1971 | Frost et al. | 104/172 S |
| 3,726,510 | 4/1973 | Davis et al. | 403/354 X |
| 3,951,076 | 4/1976 | Knudsen et al. | 105/155 |
| 4,134,175 | 1/1979 | Contoyanis | 384/296 X |
| 4,323,288 | 4/1982 | Smith, Sr. et al. | 384/449 |

Primary Examiner—Robert B. Reeves
Assistant Examiner—Scott H. Werny
Attorney, Agent, or Firm—Reising, Ethington, Barnard, Perry & Milton

[57] ABSTRACT

A wheel lock assembly for reversibly rotatably mounting a wheel assembly which comprises an inner race and an outer race and bearings disposed therebetween on a trolley which includes a central bore having a central axis and having a substantially annular recess eccentric relative to the central bore. The wheel lock assembly includes an axle member, the axle member including a cylindrical body portion having a longitudinal axis and an enlarged substantially annular head portion eccentric relative to the longitudinal axis. The wheel lock assembly further includes a cap member and locking screw for fastening the cap member to an end of the body portion of the axle member to draw the cap member into frictional engagement with the inner face and to draw the head portion of the axle member into mating engagement with the recess of the trolley arm.

9 Claims, 1 Drawing Sheet

WHEEL LOCK ASSEMBLY

BACKGROUND OF THE INVENTION (1) Field of the Invention

This invention relates to a wheel lock assembly to be utilized with overhead conveyor wheel assemblies used in industrial plants to convey various parts from one position to another.

(2) Description of the Prior Art

Overhead conveyor wheel assemblies typically comprise a wheel assembly including an outer wheel or outer race member, an inner wheel or inner race member, and a set of ball bearings interdisposed between the outer wheel and inner wheel members to permit the outer wheel to rotate freely with respect to the inner wheel. A trolley bolt is utilized to secure the wheel assembly to a trolley which is provided with a hanger or other device supported from the lower end thereof to support the article to be conveyed. The wheel assembly travels along a conveyor track to transport the article supported by the trolley from position to position as a chain drive is suitably driven by conventional means. The objectives to be obtained by such an assembly are that it is desirable to lock the inner wheel or race member of the wheel assembly against rotation with respect to the trolley so that, in use, the outer wheel or race simply rotates about the ball bearing set as the entire trolley moves down the conveyor track. The second objective is that the wheel assembly may be simply removed from the trolley and replaced without removing the entire trolley and wheel assembly from the chain drive.

SUMMARY OF THE INVENTION

The instant invention provides a wheel lock assembly for reversibly rotatably mounting a wheel assembly comprising an inner race and an outer race and bearings disposed therebetween on a trolley including a central bore having a central axis and having a substantially annular recess eccentric relative to the central bore, the wheel lock assembly including an axle member including a cylindrical body portion having a longitudinal axis and an enlarged substantially annular head portion eccentric relative to the longitudinal axis, a cap member, and fastening means for fastening the cap member to an end of the body portion to draw the cap member into frictional engagement with the inner race and to draw the head portion into mating engagement with the recess of the trolley arm.

PRIOR ART STATEMENT

The U.S. Pat. Nos. 3,553,765 to Frost, 3,602,150 to Frost et al, and 3,951,076 to Knudsen et al are examples of trolley assemblies. The Frost '150 patent discloses a multiple part wheel lock assembly including an axle and retainer members. Each inner wheel includes an annular sloped bevel or shoulder against which bears a sloped expanded head portion of the retainer member. The Frost '765 patent discloses a wheel lock assembly including an annular inner race member having an inner opening. The inner opening includes flat portions which coact with the flat portion of the extending portion of the arm of the trolley to lock the inner wheel in place. In other words, the Frost '765 patent discloses means for locking the inner wheel whereby the inner surface of the opening of the wheel coacts with the outer surface of the extending portion of the arm to prevent the inner wheel from rotating. The Knudsen et al patent discloses a wheel lock construction including an axle and retainer means including a screw and washer. The dimensions of the retainer means are predetermined so that the inner surface of the washer is spaced from the outermost portion of the end of the axle when the wheel is locked into position. In other words, the assembly is dimensioned so that the wheel is locked before the retainer means bottoms out against the axle. None of the aforementioned patents discloses a wheel lock assembly including an axle having a head which is locked relative to the trolley by the axle head coacting with a recess disposed about an opening through the trolley. Additionally, none of the aforementioned patents discloses the key slot construction of the subject retainer and axle. In other words, the instant invention provides a two-part axle construction comprising a wheel lock axle and wheel lock retainer wherein the latter is drawn into frictional engagement with the inner wheel or race to prevent unlocking movement of the socket head screw in actual use. Thus, the two-part axle assembly, particularly characterized by drawing the wheel lock retainer to the wheel lock axle to frictionally engage the shoulders thereof and to hold the inner wheel or race member in nonrotative but removable relationship to the trolley, is a significant improvement over the prior art.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
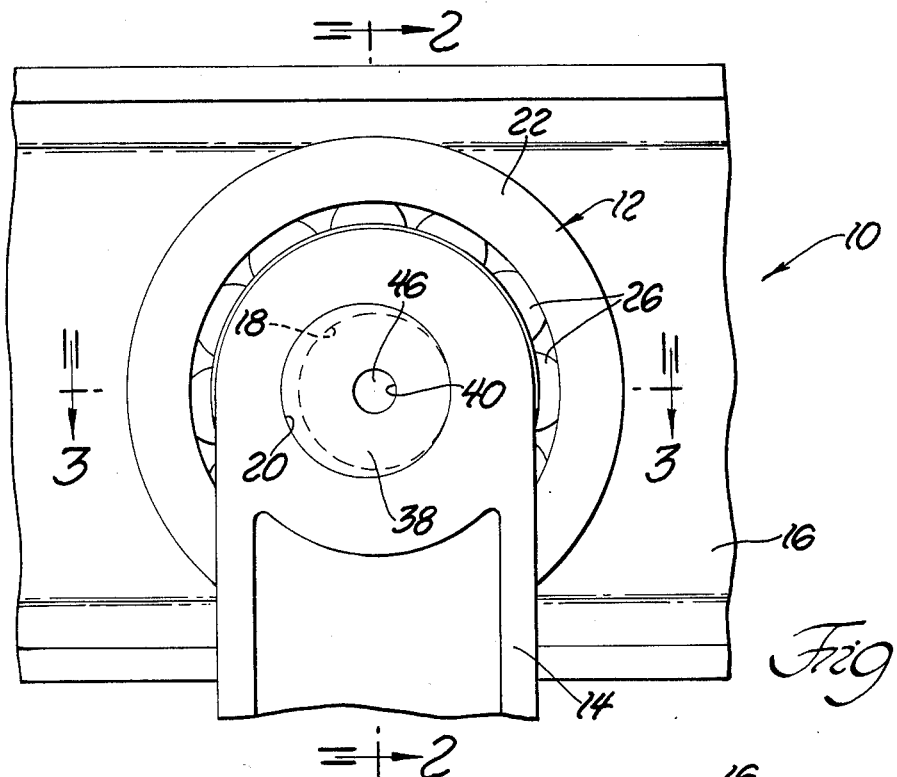
FIG. 1 is a fragmentary elevational view of a trolley assembly mounted on a monorail being constructed in accordance with the instant invention.
Figure 3:
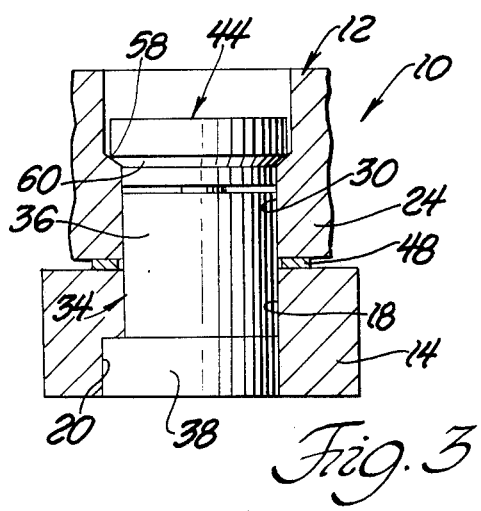
FIG. 3 is a cross sectional view taken substantially along line 3—3 of FIG. 1.
Figure 2:
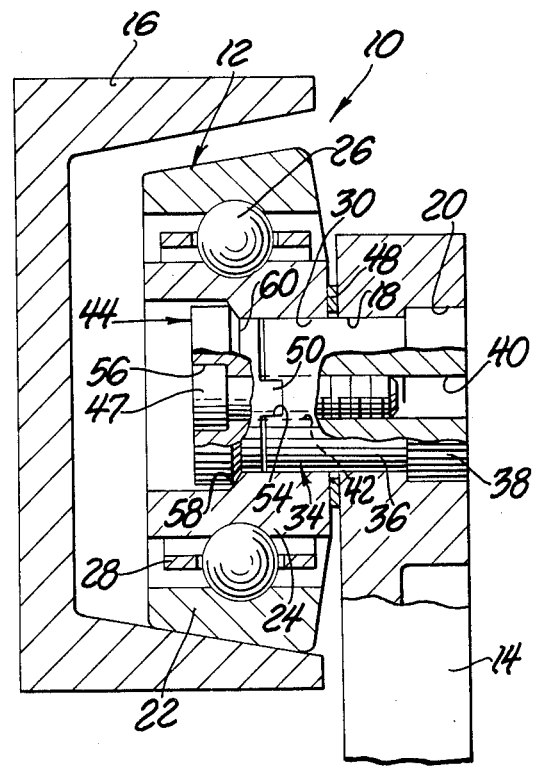
FIG. 2 is a cross sectional view, partially broken away, taken substantially along line 2—2 of FIG. 1.

A trolley assembly constructed in accordance with the instant invention is generally shown at 10.

The assembly 10 includes a wheel assembly generally indicated at 12 mounted on a trolley arm 14 to be driven along a monorail or conveyor track 16 to transport an article supported by the trolley 14 from position to position.

The trolley arm 14 includes a central bore 18 extending therethrough and defining a first axis. The trolley arm 14 further includes a substantially annular recess 20 about one end thereof, the recess 20 being eccentric with respect to the first axis defined by the central bore 18.

The wheel assembly 12 includes an outer wheel or race member 22 and an inner wheel or race member 24. A ball bearing set 26 is confined by a cage or retainer 28 between the inner race 24 and outer race 22. The inner race 24 includes a central opening 30 extending therethrough. The peripheral surface of the outer race 22 engages the conveyor track 16 and rotates relative to the trolley arm 14 so as to support the trolley arm 14 along the conveyor track 16.

Figure 4:
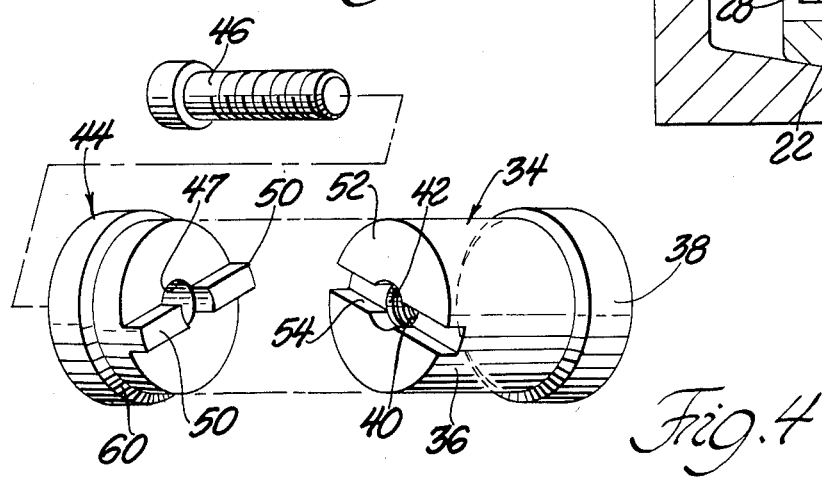
FIG. 4 is an exploded perspective view of the subject wheel lock assembly.

The assembly 10 includes mounting means for reversibly rotatably mounting the wheel assembly 12 on the trolley arm 14, an exploded perspective view of the mounting means being generally shown in FIG. 4. The mounting means includes an axle member generally indicated at 34 having a cylindrical body portion 36 defining a longitudinal axis. The axle member 34 further includes an enlarged cylindrical head portion 38 being eccentric relative to the longitudinal axis defined by the body portion 36. In other words, the enlarged cylindrical head portion 38 is offset from the longitudinal axis defined by the body portion 36. A longitudinal bore 40 extends completely through the axle 34 concentric with the axis defined by the body portion 36. The bore 40 includes an internal threaded portion 42. The body portion 36 is disposed substantially through the central bore 18 of the trolley arm 14 and extends into the central opening 30 of the inner race 24. The mounting means further includes a cap member generally shown at 44. A screw member 46 fastens the cap member 44 to a first end of the body portion 36 for fixedly engaging the inner race 24 and retaining the wheel assembly 12 upon the axle member 34, as will be described below. The enlarged cylindrical head portion 38 of the axle member 34 is in mating engagement with the recess 20 to prevent rotation of the mounting means relative to the trolley arm 14. In other words, the mounting means maintains the inner race 24 in locked relation to the trolley 14 while positively maintaining the wheel assembly 12 in operative relationship with the trolley arm 14 and readily permitting changing of the wheel assembly 12 if a need to do so should occur. Changing of the wheel merely requires the removal of the locking screw 46 to releast the cap member 44.

A gasket 48 is disposed between the inner race 24 and trolley arm 14, the inner race 24 being compressed against the gasket 48 during the mounting of the cap member 44 upon the axle 36.

The mounting means further includes locking means for preventing relative rotation between the cap member 44 and axle member 34. The locking means includes keys 50 projecting from the cap member 44. The first end of the body portion 36 of the axle member 34 includes a face 52 having a transverse slot 54 extending across the face 52. The keys 50 are in mating engagement with the transverse slot 54 upon assembly of the mounting means. The cap member 44 includes a countersunk bore 56 extending therethrough and being coaxial with the longitudinal bore 40 extending through the axle member 34. The screw member 46 is a threaded socket headlock screw which is disposed in the countersunk bore 56 and threadably engages the threaded portion 42 of the longitudinal bore 40 to draw the cap member 44 and axle member 34 together.

The central opening 30 of the inner race 24 includes a sloping shoulder 58. The cap member 44 includes a frustoconical intermediate portion 60 which is in tight frictional engagement with the sloping shoulder 58 of the inner race 24. Thus, the entire assembly is concentric about the axis defined by the body portion 36 of the axle member 34 except for the head portion 38 of the axle member. Additionally, the recess 20 is eccentric relative to the axis defined by the openings 18 and 30.

Upon assembly, the axle member 34 is inserted into the bore 18 of the trolley arm 14, and the inner race 24 is mounted on the extending portion of the body portion 36, the gasket 48 being disposed therebetween. The axis of the bore 18 and recess 20 are offset or eccentric in a similar fashion as the axis defined by the body portion 36 and the head portion 38 of the axle 34. The cap member 44 is then assembled with the keys 50 disposed in the locking slots 54 and the lock screw 46 is tightened to secure the cap member 44 to the axle member 36. During the tightening of the lock screw 46, the annular sloping shoulder 60 of the cap member 44 is drawn into tight frictional engagement with the corresponding shoulder 58 of the inner race member 24. There are clearances between the mating faces of the axle 34 and the cap member 44 in the assembled position. The clearances exist to insure that the shoulder 58 of the inner race 24 is in firm frictional engagement with the shoulder 60 of the cap member 44 before the cap member 44 and the keys 50 thereof bottom out against the locking slot 54 and first face 52 of the axle member 34. Once assembled, the axle member 34 is locked against rotation relative to the trolley 14 by the head portion 38 thereof being disposed in the recess 20 of the trolley arm 14. The inner race 24 is locked to the cap member 44 by the coaction of the shoulder 58 of the inner race 24 with the shoulder 60 of the cap member 44. The cap member 44 and axle 34 are locked together by the keys 50 and slot 54. Thus, only the outer race 22 and bearings 26 rotate during use.

When the bearings 26 wear out or the wheel assembly 12 is otherwise damaged to the extent of need of replacement, the socket head screw 46 is simply removed to remove the cap member 44 and wheel assembly 12, and a new wheel assembly 12 is installed as previously described.

Therefore, the subject assembly 10 provides a two-part axle construction; that is, the axle member 34 and cap member 44 wherein the latter is drawn into frictional engagement with the inner race 24 to prevent unlocking movement of the socket head screw 46 in actual use Simultaneously, the inner race 24 is maintained in a nonrotating position relative to the outer race 22 and the trolley arm 14 while permitting easy removal and replacement of the wheel assembly 12.

The instant invention has been described in an illustrative manner and it is to be understood that the terminology which has been used is intended to be in the nature of words of description rather than of limitation Obviously, many modifications and variations of the present invention are possible in light of the above teachings. It is, therefore, to be understood that within the scope of the appended claims, the invention may be practiced otherwise than is specifically described.

The embodiments of the invention in which an exclusive property or privilege is claimed are defined as follows:

1. A trolley assembly comprising: at least one trolley arm including a central bore therethrough having a first axis and having a substantially annular recess about one end thereof, said recess being eccentric with respect to said first axis;

a wheel assembly including an outer race and an inner race and bearing means disposed therebetween, said inner race including a central opening therethrough;

and mounting means for reversibly rotatably mounting said wheel assembly on said trolley arm and including an axle member having a cylindrical body portion having a longitudinal axis, said body portion being disposed substantially through said central bore and said central opening, said mounting means further including cap means fastened to a first end of said body portion for frictionally engaging said inner race and retaining said wheel assembly upon said axle member, said axle member including an enlarged cylindrical head portion eccentric with said longitudinal axis and in mating engagement with said recess to prevent rotation of said mounting means relative to said trolley arm.

2. An assembly as defined in claim 1 wherein said mounting means includes locking means for preventing relative rotation between said cap means and said axle member.

3. An assembly as defined in claim 2 wherein said locking means includes a key projecting from said cap means, said first end of said body portion including a face having a transverse slot extending across said face, said key being in mating engagement with said transverse slot.

4. An assembly as defined in claim 3 wherein said axle member includes a longitudinal bore concentric with said body axis and having an internally threaded portion and said cap means includes a countersunk bore extending therethrough and coaxial with said body axis, said assembly including fastening means comprising a threaded socket head lock screw disposed in said countersunk bore and threadably engaging said longitudinal bore to draw said cap means and axle member together.

5. An assembly as defined in claim 4 wherein said central opening of said inner race includes a sloping shoulder, said cap means including a frusto-conical intermediate portion in tight frictional engagement with said sloping shoulder of said inner race.

6. A wheel lock assembly for reversibly rotatably mounting a wheel assembly comprising an inner race and an outer race and bearings disposed therebetween on a trolley arm including a central bore having a central axis and having a substantially annular recess eccentric relative to the central bore, said assembly comprising:

an axle member including a cylindrical body portion having a longitudinal axis and an enlarged substantially annular head portion eccentric relative to said longitudinal axis;

a cap member; and fastening means for fastening said cap member to an end of said body portion to draw said cap member into frictional engagement with the inner race and to draw said head portion into mating engagement with the recess of the trolley arm.

7. An assembly as defined in claim 6 wherein said cap member includes a key projecting therefrom and said body portion including an end face having a transverse slot extending across said end face for mating engagement with said key.

8. An assembly as defined in claim 7 wherein said axle member includes a longitudinal bore concentric with said body axis and having an internally threaded portion, said cap member including a countersunk bore extending therethrough and coaxial with said body axis, said fastening means including a threaded socket head lock screw disposed in said countersunk bore and threadably engaging said longitudinal bore to draw said cap member and axle member together.

9. An assembly as defined in claim 8 wherein said cap member includes a frusto-conical intermediate portion.

* * * * *